J. A. CURRIE.
APPARATUS FOR THE FIXATION OF NITROGEN.
APPLICATION FILED APR. 8, 1916.

1,263,533.

Patented Apr. 23, 1918.

WITNESS

INVENTOR
J. A. CURRIE.
BY
ATT'YS.

UNITED STATES PATENT OFFICE.

JOHN ALLISTER CURRIE, OF TORONTO, ONTARIO, CANADA.

APPARATUS FOR THE FIXATION OF NITROGEN.

1,263,533.   Specification of Letters Patent.   Patented Apr. 23, 1918.

Application filed April 8, 1916. Serial No. 89,993.

*To all whom it may concern:*

Be it known that I, JOHN ALLISTER CURRIE, a subject of the King of Great Britain, and resident of the city of Toronto, in the Province of Ontario, Dominion of Canada, have invented certain new and useful Improvements in Apparatus for the Fixation of Nitrogen, of which the following is a specification.

This invention relates to an improved method for the fixation of atmospheric nitrogen or for producing similar endothermic gas reactions.

Various forms of apparatus for producing flaming and other electric arcs have been devised in which a current of air is subjected to the heat of the electric arc to effect combination between the nitrogen and oxygen therein.

Heretofore the recovery of nitrogen from the atmosphere has been extremely low, in many cases not exceeding five per cent., and one of the objects of the present invention is to increase the efficiency of the method whereby the recovery of the nitrogen will be materially increased in proportion to the current used, and the method made capable of use on a commercial scale.

Other objects are to cause the electric discharges to effectively spread over the entire area between the electrodes so that the current of air will be subjected to a temperature sufficiently high to effect the chemical combination of the nitrogen and oxygen, to effectively cool the electrodes and generally to adapt the several parts of the apparatus to better perform the functions required of them. With the above and other objects in view the invention consists essentially of the improved method wherein the air is caused to pass through the arc formed at the extremity of a hollow electrode as more particularly described and set forth in the following specification and accompanying drawings forming part of the same.

In the drawings.

Like characters of reference refer to like parts in the several figures.

Figure 1:
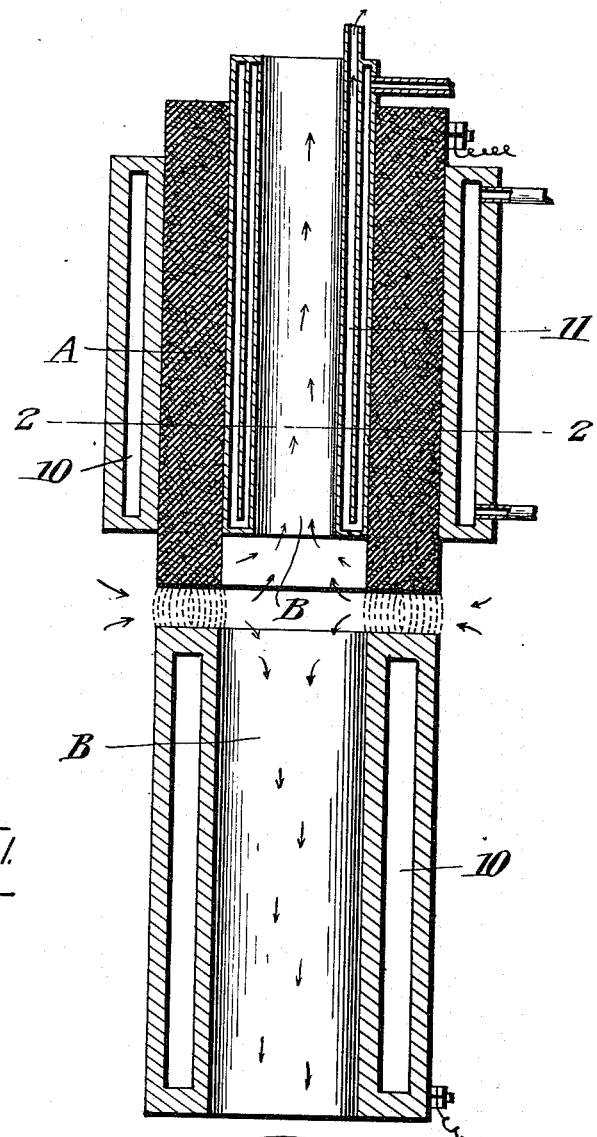
Figure 1 is a sectional elevation of the improved apparatus.
Figure 2:
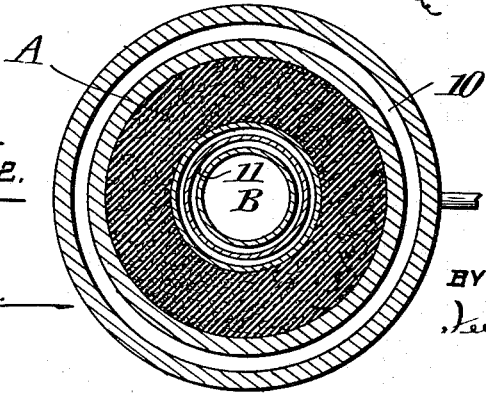
Fig. 2 is a cross section through one of the electrodes on the line 2—2.

The method forming the present invention contemplates the production of an annular arc through which arc the gases to be combined are passed. I have shown in the drawings a pair of electrodes A and B arranged opposite to each other and between the adjacent ends of which a substantially annular arc is produced by a suitable high tension current. The electrodes are tubular in form which enables the air or gases to be drawn or forced through them. Preferably the atmospheric air is drawn through the arc, by suitable suction producing means such as a pump or aspirator suitably connected to the outer ends of the hollow electrodes.

Either or both of the electrodes will be adjustably supported, and the space between their extremities regulated automatically or manually to maintain a constant arc, in any manner now well known in the art.

The electrodes will also be cooled by suitable means. I have shown inner and outer water jackets 10 and 11 for the electrode A, and have shown the electrode B formed hollow so that cooling gas or fluid may be circulated through it.

The electrodes may be formed of any suitable materials known in the art. I have shown the electrode A, formed of carbon and the electrode B of metal such as copper.

In practising the invention an annular arc is produced between the hollow or tubular electrodes, and air is drawn laterally through the arc into the electrodes from whence it is caused to pass to suitable cooling chambers and absorption towers, in the manner now practised in the various processes for the fixation of atmospheric nitrogen.

The same conditions with regard to density and intensity of the current that prevail with regard to known nitrogen fixation processes, are applicable to the present process.

The high temperature produced by the high-current arcs, will effect combination into nitrous gases of the nitrogen and the oxygen of the air, and these may be suitably cooled and recovered.

It will be observed that as the air is actually drawn through the arc it cannot fail to be acted on thereby, as an alternative to drawing the air through the electrodes it might be forced by pumping or otherwise through the electrodes and out through the arc.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

An apparatus for the purpose specified comprising a pair of opposite tubular electrodes arranged in alinement and having relatively wide, flat, annular, opposing parallel arcing surfaces between which a continuous and relatively thick annular arc may be produced, means for passing gas through the arc and electrodes, internal and external water jackets on the electrodes adapted to cool the gas immediately after it has passed through the arc and prevent disintegration of the electrodes.

In witness whereof I have hereunto set my hand in the presence of two witnesses.

JOHN ALLISTER CURRIE.

Witnesses:
 JAMES MITCHELL,
 RUSS STUART.